Feb. 17, 1925.
W. M. BRADSHAW
1,526,315
TEMPERATURE INDICATOR
Filed Dec. 7, 1920
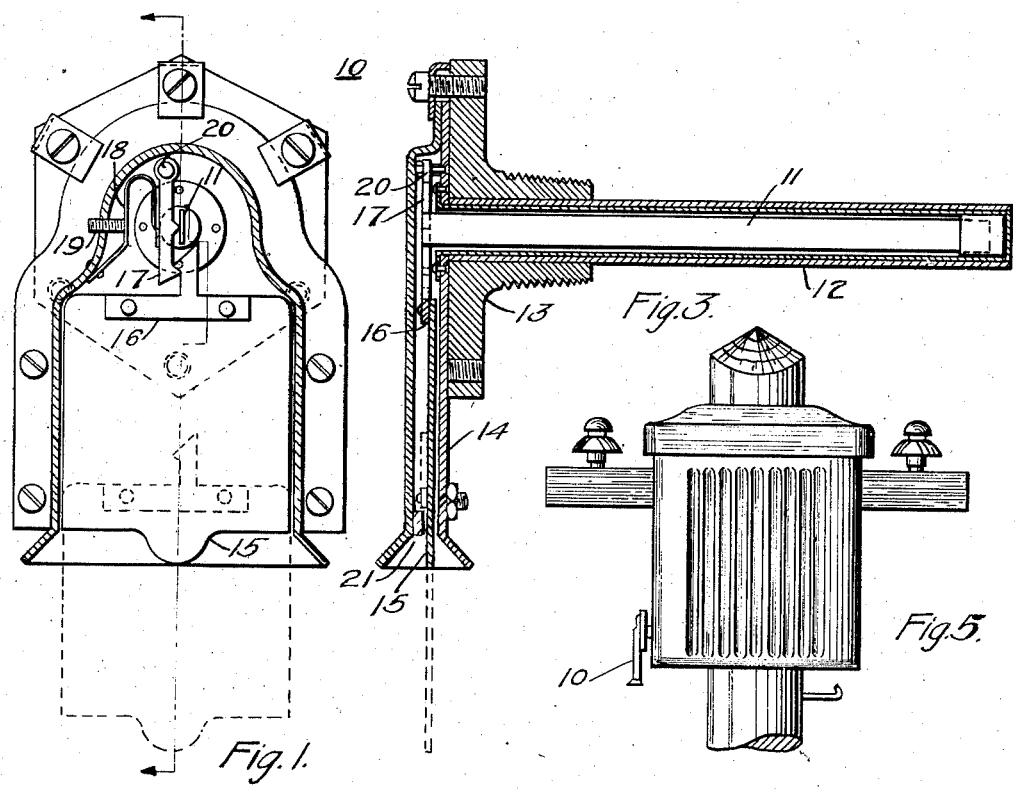
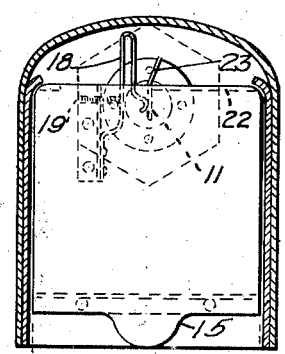
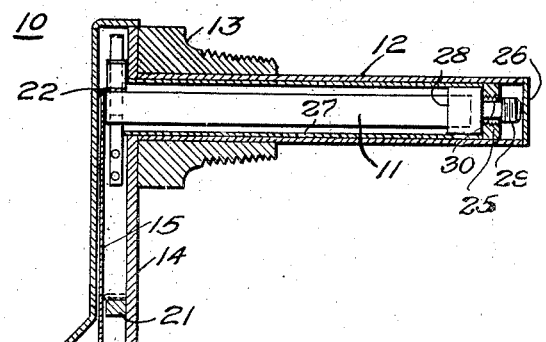
WITNESSES:
INVENTOR
William M. Bradshaw
BY
Wesley G. Carr
ATTORNEY Patented Feb. 17, 1925.

1,526,315

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE INDICATOR.

Application filed December 7, 1920. Serial No. 429,031.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Temperature Indicators, of which the following is a specification.

My invention relates to temperature indicators and particularly to temperature indicators for distributing transformers.

One object of my invention is to provide means for indicating the occurrence of a predetermined temperature in a pole-mounted transformer.

Another object of my invention is to provide such means that may be readily visible from the street below the transformer.

Another object of my invention is to provide a device, of the above indicated character, that may be removably located in the oil drain of the transformer tank.

Still another object of my invention is to provide a device, of the above indicated character, that may be easily reset.

A still further object of my invention is to provide a temperature indicator, of the above indicated character, that shall be simple and economical in its construction and reliable in its operation.

In practicing my invention, I provide a thermal-responsive device, such as a bimetallic member, that shall be subjected to the temperature of the oil surrounding the transformer. I also provide a semaphore that is normally hidden from view and may be released when the bimetallic member moves a predetermined amount in response to the temperature to which it is subjected. The semaphore is adapted, when released, to move to a position at which it is visible, to indicate that the predetermined temperature has been attained in the transformer. The indicator is easily and simply reset by merely moving the semaphore back to its initial position. The indicator is so arranged that the semaphore will be actuated by gravity when released. It is obvious, however, that a spring may be employed for accomplishing the same result.

In the accompanying drawings, Figs. 1 and 2 are front views, partially in elevation and partially in section, of two forms of temperature indicators embodying my invention.

Figs. 3 and 4, respectively, are side views, partially in elevation and partially in section, of the indicators illustrated in Figs. 1 and 2, respectively.

Fig. 5 is an elevational view, illustrating the disposition of the indicator on a pole-mounted transformer.

Referring to Figs. 1 and 3, a temperature indicator 10 comprises a bimetallic member 11 that is disposed in a tubular member 12 and secured thereto at one end thereof, which end shall be inserted into the oil of the transformer to be influenced by the temperature of the oil. The opposite end of the tubular member 12 has a threaded portion 13 disposed thereon that may be threaded into the oil drain of a transformer, the temperature of which is to be indicated. A flat housing 14 is supported by the threaded portion 13 and serves to enclose a semaphore 15 to protect the same from rain or snow or from the accumulation of dirt. A supporting member 16, that is mounted on the semaphore, is normally engaged by a latch member 17, movement of which is caused by the force of the bimetallic member 11 against a resilient spring 18. The effective force of the spring 18 may be adjusted by an adjustable member 19 to determine the temperature at which the indicator shall operate.

When the bimetallic member 11 becomes heated to a predetermined degree, its movement forces the latch member 17 about its pivot pin 20 against the compression force of the spring 18 to release the supporting member 16. The semaphore 15 is thereupon actuated, by the force of gravity, to a lower position, at which it becomes visible. A stop 21 limits the movement of the semaphore and supports it until the indicator may be reset.

Referring to the indicator that is illustrated in Figs. 2 and 4, the latch member 17 of the indicator described above is eliminated and the bimetallic member 11 is arranged to act directly upon the spring 18. The top edge 22 of the semaphore is bent over perpendicularly to the surface thereof, and serves to support the semaphore 15 on the bimetallic member 11. A portion 23 of the top edge 22 is so turned back at an angle that it may slidingly engage the bimetallic member 11 to reset the indicator. That is, after the semaphore has once been permitted to drop by reason of the increased temperature of the bimetallic member 11 and its movement thereof to the left, the semaphore may be reset by raising it until the portion 23 engages the bimetallic member 11 and forces the bimetallic member back until the bent back portion 23 and the top edge 22 are raised above the bimetallic member 11. The bimetallic element 11 is thereupon forced back into position under the bent over edge 22 by the spring 18. By employing a single piece of sheet metal for the semaphore, the indicator may be economically made.

The indicator that is illustrated in Fig. 4 comprises an outer casing composed of the tubular member 12 and the threaded portion 13 that is secured thereto, at one end, to be threaded into the oil drain of a transformer. A threaded washer 25 is disposed in the tubular member 12 at the other end thereof. The end of the tube 12 is then sealed in any desired manner, as by a disc 26. The disc so closes the end of the tube 12 that no oil may enter the tubular member 12 from the tank within which such member may be disposed.

The inner casing, that is adapted to be inserted within the tubular member 12, comprises a tubular member 27 that is of such size as to be freely movable within the tubular member 12. At one end of the inner tube 27 is disposed a supporting member 28 upon which the bimetallic member 11 is supported. The supporting member 28 is provided with a portion extending longitudinally with respect to the tube 27 and comprises a threaded end portion 29 and a reduced shank portion 30.

When the tube 27 is inserted into the tube 12 and properly rotated, the threaded portion 29 is threaded into and through the threaded washer 25 after which the tube 27 may be freely rotated within the tube 12 in either direction so long as no attempt is made to withdraw the tube 27 from the tube 12. It will be observed that the threaded washer 25 is disposed at a distance, from the end of the tube, that is sufficient to provide space for free movement of the threaded portion 29.

The purpose in constructing an indicator as illustrated in Fig. 4 is to permit the outer casing, consisting of the tube 12 and the threaded portion 13, to be inserted in the oil drain of a transformer when the transformer is first constructed, or for transformers that are already in service and from which the drain hole plug may be removed. The inner tube 27 containing the thermally-responsive bimetallic member 11 may then be inserted, whenever desirable, after the transformer has been placed in position, as upon an outdoor pole.

By providing a lost motion between the outer tube 12 and the inner tube 27, as by the threaded washer 25 and the threaded portion 29, the washer serves as a lock to retain the inner tube 27 in position within the tube 12 to prevent a wind from forcing the inner tube out of the enclosing tube 12. By employing a locking structure comprising the threaded washer 25 and the threaded portion 29, the tube 27 may be inserted within the tube 12 and the casing containing the semaphore 14 permitted to depend in a vertical plane from the tube 27.

Since transformer tanks are provided with oil drains having removable plugs, the threaded hole, that is used as a drain, may be employed as the opening through which the indicator may be inserted into the oil.

Since the temperature of the oil at the bottom of the transformer tank bears a predetermined ratio to the temperature of the oil at the top, the indicator may be adjusted to operate at any predetermined temperature, corresponding to the hottest temperature of the transformer. The employment of the oil drain of the transformer tank permits the indicator to be employed with present operating transformers without costly adjustments or changes.

Although the indicator is shown in connection with a pole-mounted transformer, it is obvious that the indicator may be employed with all kinds of heat-storage devices to indicate the development of a predetermined temperature therein.

Although I have shown several preferred forms of indicators embodying my invention, I do not wish to be limited to the specific structures illustrated, inasmuch as various modifications may be made within the spirit and scope of the invention, as set forth in the appended claims.

I claim as my invention:

1. A temperature indicator for a transformer comprising a thermal-responsive member subjected to the temperature of a portion of the transformer and a movable member normally suspended thereon but released when the thermal-responsive member attains a predetermined temperature.

2. A temperature indicator for a transformer comprising an outer tubular member, a thermo-responsive member in said tubular member and having free turning movement relatively thereto, a housing supported by said tubular member and having free turning movement relatively thereto, and a gravity-actuable member normally concealed in said housing and releasable by said thermo-responsive member to a position outside of said housing when the temperature of the transformer reaches a predetermined value.

3. A temperature indicator for a transformer comprising an outer tubular member adapted to extend into a transformer, a gravity-actuable member supported by said outer tubular member and having free turning movement relatively thereto, and a thermo-responsive member in said casing operative to release said gravity-actuable member when the temperature of said transformer reaches a predetermined value.

4. A temperature indicator for a transformer comprising an outer tubular member adapted to extend into a transformer, a gravity-actuable member supported by said tubular member and having free turning movement relatively thereto, a thermo-responsive member in said tubular member for permitting free movement of said gravity-actuable member when the temperature of said transformer reaches a predetermined value, and stop means for limiting the movement of said gravity-actuable member.

5. A temperature indicator for a transformer comprising a gravity-actuable member and a latching member for controlling the same in accordance with a predetermined temperature of the transformer.

6. A temperature indicator for a transformer comprising a gravity-actuable member, a bimetallic member for releasing that member upon the occurrence of a predetermined ambient temperature and a casing for normally enclosing both members and for supporting the bimetallic member.

7. A temperature indicator for a transformer comprising a thermal-responsive member subjected to the temperature of the transformer, a gravity-actuable member released thereby when the thermal member is heated to a predetermined degree and a stop member for limiting the movement of the gravity-actuable member.

8. A temperature indicator for a transformer comprising a thermal-responsive member, a gravity-actuable member, and a latch member for normally supporting said gravity-actuable member and actuated by said thermal-responsive member to permit said gravity-actuable member to be released to move quickly and freely through a predetermined distance.

9. A temperature indicator for a transformer comprising a longitudinal bimetallic member, a substantially rectangular member disposed in a plane perpendicular to the longitudinal axis of the bimetallic member and adjacent to one end thereof, and a casing for enclosing both members and for supporting one end of the bimetallic member.

10. A temperature indicator for a transformer comprising a longitudinal tubular casing, a bimetallic member disposed therein and having one end mounted at one end of the casing, a substantially flat casing disposed at the other end of the casing in a plane perpendicular to the axis of the tubular member, a gravity-actuable indicating member disposed therein and normally supported by the free end of the bimetallic member and a stop member for limiting the movement of indicating member when released by the bimetallic member.

11. A temperature-indicating device for a transformer disposed in a casing having a hole therein serving as an oil drain, said temperature indicator comprising an enclosing casing having a tubular longitudinally extended portion adapted to be inserted into the transformer casing, a threaded portion disposed at one end of said portion that may be removably screwed into the oil drain to serve both as a plug therefor and as a supporting means for the indicator, a substantially flat portion secured to the threaded portion and having a chamber communicating with the chamber of the tubular member, a bimetallic member disposed in the tubular member and having one end thereof secured to the inner end of the longitudinal portion of the casing and the other end free to move under the influence of the temperature of the transformer, a semaphore normally maintained out of sight within the flat portion of the casing by the bimetallic member and released thereby when the temperature of the transformer attains a predetermined value and a stop member for limiting the movement of the semaphore when the same is released.

12. A temperature indicator for a transformer, comprising a housing, a gravity-actuable semaphore normally hidden therein, and thermal-responsive means for releasing said semaphore to a visible position outside of said casing.

13. In a temperature indicator, the combination with a bimetallic member, of a semaphore normally supported thereon and released at a predetermined temperature, comprising a single piece of sheet material having one edge turned over to support the semaphore on the bimetallic member, a portion of that edge being bent back at an angle to slidingly engage the bimetallic member to cause it to slide back under the bent-over edge of the semaphore.

14. In a temperature indicator, in combination, two tubular members, one of which is adapted to be longitudinally inserted into the other and rotated therein, a washer provided with centrally disposed internal screw threads and disposed adjacent one end of the outer member, a supporting member comprising a longitudinally extending portion disposed on the end of the inner member and having a screw threaded portion and a reduced shank portion, the screw threaded portion being adapted to be threaded through the washer to permit rotation of the inner member within the outer member while precluding relative longitudinal movement therebetween, a housing secured to the inner tubular member, a semaphore normally hidden therein, and a thermal-responsive member in said inner tubular member secured to said supporting member and effective to release said semaphore, upon the occurrence of a predetermined temperature of said thermal-responsive member.

15. A temperature indicator for service with a heat-storage device comprising a tubular member closed at one end and inserted into the heat-storage device to be influenced by the temperature therein, a second tubular member adapted to be inserted within the first tubular member, means co-operating between the two tubular members whereby movement of the inner or second tubular member may be effected in a rotary direction to permit the inner member to assume a predetermined position relative to a vertical plane therethrough while at the same time direct extraction of the inner member from the outer member is precluded, a thermal-responsive member in said second tubular member, a gravity-actuable semaphore released by said thermal-responsive member at a predetermined temperature of said heat-storage device.

16. A temperature-indicating device for a transformer located in a casing having an oil-drain hole therein, said device comprising a tubular casing adapted to extend into said transformer casing, a screw-threaded member secured to said tubular casing and adapted to be screwed tightly into said oil-drain hole, a thermal-responsive member in said tubular casing, and a gravity-actuable semaphore releasable by said thermal-responsive member, said thermal-responsive member and said semaphore having free turning movement relatively to said tubular casing and said screw threaded member.

In testimony whereof, I have hereunto subscribed my name this 22nd day of November, 1920.

WILLIAM M. BRADSHAW.